United States Patent
Ando et al.

(10) Patent No.: US 7,679,729 B2
(45) Date of Patent: Mar. 16, 2010

(54) LIGHT WAVE RADAR APPARATUS

(75) Inventors: Toshiyuki Ando, Tokyo (JP); Yoshihito Hirano, Tokyo (JP); Hiroshi Sakamaki, Tokyo (JP); Toshio Wakayama, Tokyo (JP); Syumpei Kameyama, Tokyo (JP); Masashi Furuta, Tokyo (JP); Masahiro Hagio, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 584 days.

(21) Appl. No.: 10/575,379

(22) PCT Filed: Sep. 15, 2004

(86) PCT No.: PCT/JP2004/013451

§ 371 (c)(1),
(2), (4) Date: Apr. 11, 2006

(87) PCT Pub. No.: WO2006/030502

PCT Pub. Date: Mar. 23, 2006

(65) Prior Publication Data

US 2007/0058156 A1   Mar. 15, 2007

(51) Int. Cl.
*G01P 3/36* (2006.01)
(52) U.S. Cl. ......................... 356/28.5; 356/28
(58) Field of Classification Search ............... 356/28, 356/28.5, 337, 342
See application file for complete search history.

(56) References Cited

U.S. PATENT DOCUMENTS

| 4,995,720 | A | 2/1991 | Amzajerdian |
| 5,394,238 | A | 2/1995 | Mocker et al. |
| 6,285,288 | B1* | 9/2001 | Langdon et al. .......... 340/603 |
| 6,765,654 | B2 | 7/2004 | Asaka et al. |
| 6,856,396 | B2* | 2/2005 | McGuire .................. 356/450 |
| 7,023,531 | B2* | 4/2006 | Gogolla et al. .......... 356/5.01 |
| 2004/0263826 | A1* | 12/2004 | Langdon ................. 356/28.5 |
| 2007/0109528 | A1* | 5/2007 | Caldwell et al. .......... 356/28 |

FOREIGN PATENT DOCUMENTS

| JP | 63-71675 A | 4/1988 |
| JP | 63-266382 A | 11/1988 |
| JP | 3-252586 A | 11/1991 |
| JP | 4-133533 A | 5/1992 |
| JP | 2003-240852 A | 8/2003 |

OTHER PUBLICATIONS

Stolen, R.H., et al. "Self-phase-modulation in silica optical fibers"; Physical Review A, vol. 17, No. 4; Apr. 1978, pp. 1448-1453; XP-002514689.

* cited by examiner

*Primary Examiner*—Isam Alsomiri
(74) *Attorney, Agent, or Firm*—Birch, Stewart, Kolasch, & Birch, LLP.

(57) ABSTRACT

A light wave radar apparatus includes a frequency deviation detecting unit 12 for detecting a frequency deviation $f_{chirp}$ of a light signal, and a weighted average processing unit 13 for determining a systematic error $\Delta V_{offset}$ from the frequency deviation $f_{chirp}$ detected by the frequency deviation detecting unit 12, and subtracts the systematic error $\Delta V_{offset}$ from a wind velocity $V_W$ calculated by a Doppler signal processing unit 11. As a result, the light wave radar apparatus can carry out a measurement of the wind velocity $V_W$ with a high degree of precision.

9 Claims, 9 Drawing Sheets

Example of Velocity Offset ΔVoffset Which Is Calculated Based
On Both Frequency Deviation fchirp of Pulsed Transmission
Light of Wavelength $\lambda = 1.5\ \mu m$, And Equation (2)

| Object Distance Resolution [m] | Transmission Light Pulse Width [$\mu$ sec] | Transmission Light Frequency Deviation [MHz] | Offset Wind Velocity [m/s] |
|---|---|---|---|
| 37.5 | 0.25 | -1.01 | 0.76 |
| 75 | 0.5 | -0.41 | 0.31 |
| 150 | 1.0 | -0.20 | 0.15 |

(a)

(b)

(a)

(b)

(c)

Output Pulse Intensity Waveform of Transmission Light

Computed Result of Transmission Light Frequency Deviation Which Is Based On Self-Phase Modulation

LIGHT WAVE RADAR APPARATUS

FIELD OF THE INVENTION

The present invention relates to a light wave radar apparatus which emits pulsed light toward a space so as to measure a wind velocity according to a Doppler shift of scattered light resulting from a scattering of the pulsed light by movements of aerosols in the space.

BACKGROUND OF THE INVENTION

A related art light wave radar apparatus is provided with a light source for emitting a light signal, a light intensity modulator for modulating the light signal emitted from the light source to output pulsed light, a light amplifier for amplifying the pulsed light modulated by the light intensity modulator, a light transmit-receive system for emitting the pulsed light amplified by the light amplifier toward a space, and for collecting scattered light resulting from a scattering of the pulsed light by the space, and a receiving circuit for Doppler radar for heterodyne-detecting both a local part of the light signal emitted from the light source, and the scattered light collected by the light transmission-receive system so as to acquire the Doppler frequency of the wind velocity in the space (for example, refer to patent reference 1).

Such a related art light wave radar apparatus disposed in an airplane can cancel the Doppler frequency of the flying speed of the airplane so as to acquire the Doppler frequency of the wind velocity.

However, when the pulsed light amplified by the light amplifier is made to propagate to the light transmission-receive system by way of a waveguide of optical-fiber type, a change occurs in the refractive index of the waveguide in proportion to a change in the intensity of the pulsed light according to the nonlinear effect of the fiber core medium. As this refractive index change occurs, the phase of the pulsed light propagating changes (self-phase modulation). It is known that this phase change is proportional to the intensity of the pulsed light (Kerr effect).

Furthermore, since the intensity of the pulsed light changes with time, the phase of the pulsed light also changes with time. Since a rate of change in the phase of light which changes with time corresponds to a change in the frequency of the light, the frequency of the pulsed light transmitted deviates from its original value.

In addition, when the frequency of the pulsed light transmitted deviates from its original value, an offset occurs in the Doppler speed (equivalent to the Doppler frequency) of the wind velocity which is measured by the receiving circuit for Doppler radar.

For example, in a case where the related art light wave radar apparatus transmits the pulsed light of a wavelength of 1.5 μm, when a frequency deviation of 1.3 MHz occurs in the pulsed light, the frequency deviation corresponds to an offset error of 1 m/s in the Doppler speed.

[Patent reference 1] JP,2003-240852,A (see paragraphs [0016] and [0024], and FIG. 1)

A problem with the related art light wave radar apparatus constructed as mentioned above is that when the frequency of the pulsed light transmitted deviates from its original value, an offset occurs in the Doppler speed of the wind velocity which is measured by the receiving circuit for Doppler radar, and therefore the wind velocity in the sight line direction cannot be measured with a high degree of precision.

The present invention is made in order to solve the above-mentioned problem, and it is therefore an object of the present invention to provide a light wave radar apparatus which detects a frequency deviation of pulsed light transmitted to outside to carry out a high-precision measurement of a wind velocity.

DISCLOSURE OF THE INVENTION

A light wave radar apparatus in accordance with the present invention includes a frequency deviation detecting means for detecting a frequency deviation of a light signal emitted out of a light emitting means.

Therefore, the present invention offers an advantage of being able to detect the frequency deviation of pulsed light transmitted to carry out a process of correcting the wind velocity in the sight line direction according to the frequency deviation, and so on, and hence to carry out a high-precision measurement of the wind velocity.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
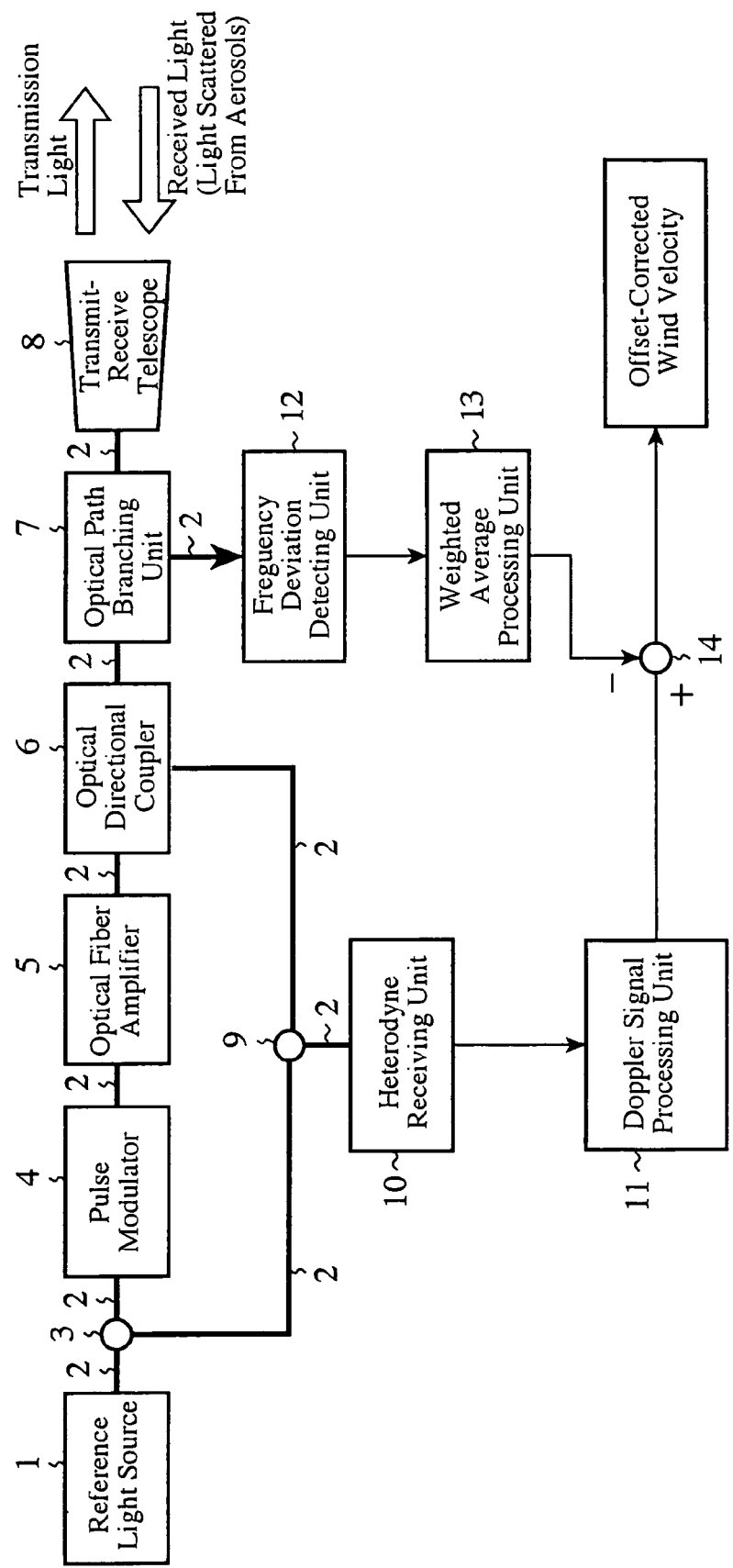
FIG. 1 is a block diagram showing a light wave radar apparatus in accordance with embodiment 1 of the present invention.

FIG. 1 is a block diagram showing a light wave radar apparatus in accordance with embodiment 1 of the present invention. In the figure, a reference light source 1 emits a light signal of a frequency of ν, and outputs the light signal to an optical fiber 2. The reference light source 1 constitutes a light emitting means.

An optical fiber 2 is inserted between any two adjacent components of the light wave radar apparatus, and constitutes an optical guide means for making light output from each component propagate therethrough.

An optical path branching unit 3 branches the light signal emitted out of the reference light source 1, outputs a part of the light signal to a pulse modulator 4, and also outputs, as local oscillation light, a part of the light signal to an optical path branching unit 9.

The pulse modulator 4 intensity-modulates the part of the light signal branched thereto by the optical path branching unit 3 to generate and output pulsed light. An optical fiber amplifier 5 amplifies the pulsed light outputted from the pulse modulator 4.

An optical directional coupler 6 outputs the pulsed light amplified by the optical fiber amplifier 5 to an optical path branching unit 7, and also outputs scattered light collected by a transmit-receive telescope 8 to the optical path branching unit 9.

The optical path branching unit 7 branches the pulsed light outputted from the optical directional coupler 6, and outputs a great part of the pulsed light to the transmit-receive telescope 8 and also outputs a part of the pulsed light to a frequency deviation detecting unit 12.

The transmit-receive telescope 8 enlarges the beam diameter of the great part of the pulsed light into which the pulsed light outputted from the optical directional coupler 6 is branched, and emits out the great part of the pulsed light toward a space and also collects the scattered light resulting from a scattering of the pulsed light by the space. The transmit-receive telescope 8 constitutes a light transmit-receive means.

The optical path branching unit 9 combines the local oscillation light outputted from the optical path branching unit 3, and the scattered light outputted from the optical directional coupler 6 into combined light, and outputs the combined light to a heterodyne receiving unit 10.

The heterodyne receiving unit 10 heterodyne-detects the combined light into which the local oscillation light outputted from the optical path branching unit 9 and the scattered light are combined, and outputs a signal indicating a difference frequency component having a frequency corresponding to the difference between the frequency of the local oscillation light and that of the scattered light.

A Doppler signal processing unit 11 calculates a wind velocity in a sight line direction from the difference frequency component indicated by the output signal of the heterodyne receiving unit 10.

A wind velocity calculating means is provided with the optical path branching unit 3, optical directional coupler 6, optical path branching unit 9, heterodyne receiving unit 10, and Doppler signal processing unit 11.

The frequency deviation detecting unit 12 detects a frequency deviation of the part of the pulsed light outputted from the optical path branching unit 7.

A weighted average processing unit 13 acquires a weighted average of the detection result obtained by the frequency deviation detecting unit 12 so as to determine a systematic error from the weighted-averaged frequency deviation.

A frequency deviation detecting means is provided with the optical path branching unit 7, frequency deviation detecting unit 12, and weighted average processing unit 13.

A subtractor 14 subtracts the systematic error determined by the weighted average processing unit 13 from the wind velocity calculated by the Doppler signal processing unit 11 so as to remove the systematic error from the wind velocity. The subtractor 14 constitutes a wind velocity correcting means.

Next, the operation of the light wave radar apparatus in accordance with this embodiment of the present invention will be explained.

The reference light source 1 emits a light signal of a frequency of ν, and outputs the light signal to the optical fiber 2.

When the optical path branching unit 3 receives the light signal emitted out of the reference light source 1 via the optical fiber 2, the optical path branching unit outputs a part of the light signal to the pulse modulator 4, and also outputs a part of the light signal, as local oscillation light, to the optical path branching unit 9.

When receiving the part of the light signal branched by the optical path branching unit 3 via the optical fiber 2, the pulse modulator 4 intensity-modulates the part of the light signal and outputs pulsed light.

When receiving the pulsed light outputted from the pulse modulator 4 via the optical fiber 2, the optical fiber amplifier 5 amplifies the pulsed light.

When receiving the pulsed light amplified by the optical fiber amplifier 5 via the optical fiber 2, the optical directional coupler 6 outputs the pulsed light to the optical path branching unit 7.

When receiving the pulsed light outputted from the optical directional coupler 6 via the optical fiber 2, the optical path branching unit 7 branches the pulsed light and outputs a great part of the pulsed light to the transmit-receive telescope 8. The optical path branching unit 7 also outputs a part of the pulsed light to the frequency deviation detecting unit 12.

When receiving the great part of the pulsed light which is branched from the optical directional coupler 6 via the optical fiber 2, the transmit-receive telescope 8 emits out the pulsed light toward a space after enlarging the beam diameter of the pulsed light.

The pulsed light emitted out toward the space from the transmit-receive telescope 8 is scattered by minute dust in the space (i.e., aerosols). Since aerosols have the property of moving at a speed which is the same as the wind velocity, scattered light resulting from a scattering of the pulsed light by aerosols in the space has a frequency of $\nu+\Delta f_D$ including a Doppler shift $\Delta f_D$ which is caused by movements of the aerosols.

The transmit-receive telescope 8 collects the scattered light resulting from a scattering of the pulsed light by the space.

When receiving the scattered light collected by the transmit-receive telescope 8 via the optical fiber 2, the optical directional coupler 6 outputs the scattered light to the optical path branching unit 9.

When the optical path branching unit 9 receives the local oscillation light of a frequency of ν from the optical path branching unit 3 and the scattered light of a frequency of $(\nu+\Delta f_D)$ from the optical directional coupler 6, the optical path branching unit 9 combines the local oscillation light and scattered light into combined light and outputs the combined light to the heterodyne receiving unit 10.

When receiving the combined light from the optical path branching unit 9, the heterodyne receiving unit 10 heterodyne-detects the combined light so as to detect an intensity alternating component of the combined light. Although a frequency component of a frequency of $(2\nu+\Delta fD)$ which is the sum of the local oscillation light and scattered light and a frequency component of a frequency of $\Delta f_D$ which is the difference between them are included in the intensity signal of the combined light, the heterodyne receiving unit 10 converts only the frequency component of a frequency of $\Delta f_D$ which is the difference between the local oscillation light and scattered light into an electric signal.

When receiving the electric signal indicating the frequency component of a frequency of $\Delta f_D$ from the heterodyne receiving unit 10, the Doppler signal processing unit 11 analog-to-digital converts the electric signal into a digital signal, and performs an FFT (Fast Fourier Transform) process on the digital signal and estimates a frequency at which a peak value of the resulting spectrum is obtained so as to detect the Doppler frequency $\Delta f_D$.

The Doppler signal processing unit 11 then calculates the wind velocity $V_W$ in the sight line direction by substituting the Doppler frequency $\Delta f_D$ into the following equation (1):

$$V_W = \lambda \cdot \Delta f_D / 2 \qquad (1)$$

where $\lambda$ is the wavelength of the pulsed light.

When receiving the remaining part of the pulsed light from the optical path branching unit 7, the frequency deviation detecting unit 12 detects a frequency deviation $f_{chirp}$ of the light signal by, for example, detecting the frequency of the light signal.

The weighted average processing unit 13 acquires a weighted average of the detection result of the frequency deviation detecting unit 12 in order to improve the accuracy of the detection of the frequency deviation $f_{chirp}$.

Since only the systematic error $\Delta V_{offset}$ is included in the wind velocity $V_W$ calculated by the Doppler signal processing unit 11 due to the frequency deviation $f_{chirp}$, the weighted average processing unit determines the systematic error $\Delta V_{offset}$ from the weighted-averaged frequency deviation $f_{chirp}$.

$$\Delta V_{offset} = \lambda \cdot f_{chirp} / 2 \qquad (2)$$

After the weighted average processing unit 13 determines the systematic error $\Delta V_{offset}$, the subtractor 14 subtracts the systematic error $\Delta V_{offset}$ from the wind velocity $V_W$ calculated by the Doppler signal processing unit 11.

As can be seen from the above description, the light wave radar apparatus in accordance with this embodiment 1 includes the frequency deviation detecting unit 12 for detecting the frequency deviation $f_{chirp}$ of the light signal, and the weighted average processing unit 13 for determining the systematic error $\Delta V_{offset}$ from the frequency deviation $f_{chirp}$ detected by the frequency deviation detecting unit 12, and is so constructed as to subtract the systematic error $\Delta V_{offset}$ from the wind velocity $V_W$ calculated by the Doppler signal processing unit 11. Therefore, the present embodiment offers an advantage of being able to carry out a high-precision measurement of the wind velocity $V_W$.

As a result, the wind velocity $V_W$ in the sight line direction can be precisely measured. Hereafter, the explanation is directed to an experimental verification of how the wind velocity $V_W$ in the sight line direction can be properly corrected.

Figures 2, 3:
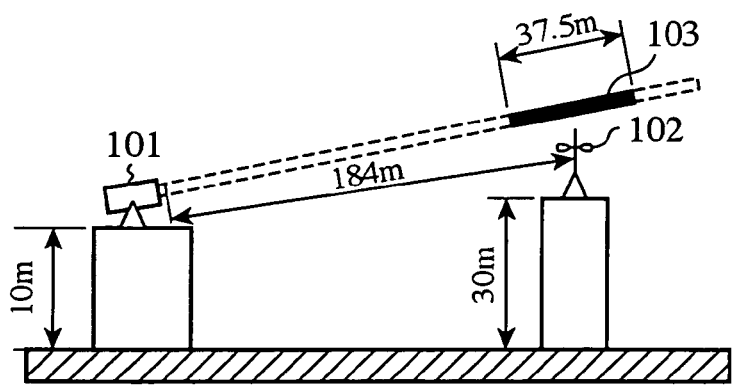
FIG. 2 is an explanatory diagram showing an example of a frequency deviation $f_{chirp}$ for each of transmission pulse widths (0.25 μs, 0.5 μs, and 1.0 μs) and $\Delta V_{offset}$ which is a velocity offset calculated based on equation (2) in a case where pulsed light has a wavelength of $\lambda=1.5$ μm.
FIG. 3 is a diagram showing the layout of equipment used for experimental verification of a wind velocity offset correction.

FIG. 2 shows an example of the frequency deviation $f_{chirp}$ for each of transmission pulse widths (0.25 µs, 0.5 µs, and 1.0 µs) and $\Delta V_{offset}$ which is the velocity offset calculated based on the equation (2) in a case where the pulsed light has a wavelength of $\lambda = 1.5$ µm.

FIG. 3 shows the layout of equipment used for the experimental verification of the wind velocity offset correction, and, in the example of FIG. 3, a cup anemometer 102 was used, as the reference for the measurement of the wind velocity, to measure the wind velocity at the same time when the light wave radar 101 measured the wind velocity.

In order to avoid the spatial disorder of a wind velocity field which could occur in the vicinity of the earth's surface which was not smooth, the cup anemometer 102 was installed on a tower having a height above the ground of 30 m and the light wave radar 101 was installed on a building's roof having a height above the ground of 10 m, which was 184 m distant from the tower, so that the light wave radar 101 applied transmission laser light to an observation space 103 which was located at much the same as the location where the cup anemometer 102 was placed to measure the wind velocity. The object distance resolution of the light wave radar 101 was 37.5 m, the pulse width of the laser light was 0.25 µs, and the amount of offset correction was 0.77 m/s.

A wind velocity component associated with the direction of radiation (i.e., the sight line direction) of the transmission laser light emitted out of the light wave radar 101 was calculated from the wind velocity and wind direction measured by the cup anemometer 102, and was compared with the velocity-offset-corrected measurement obtained by the light wave radar.

Figure 4:
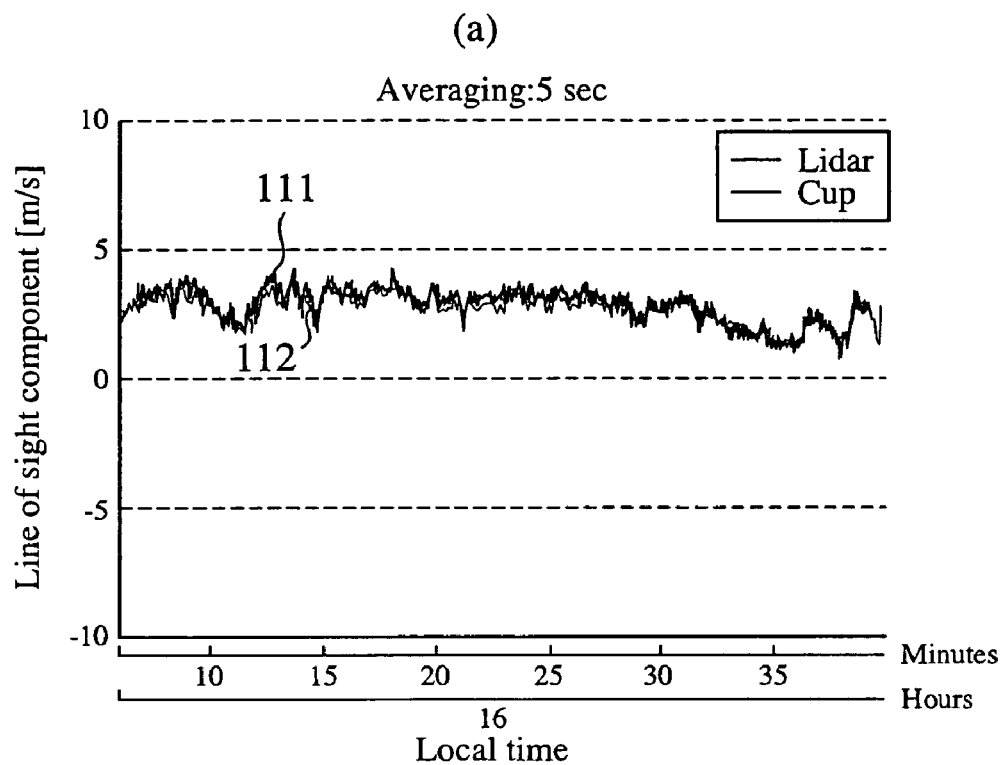
FIG. 4 is an explanatory diagram showing a verification experimental result of the wind velocity offset correction.
Figure 4:
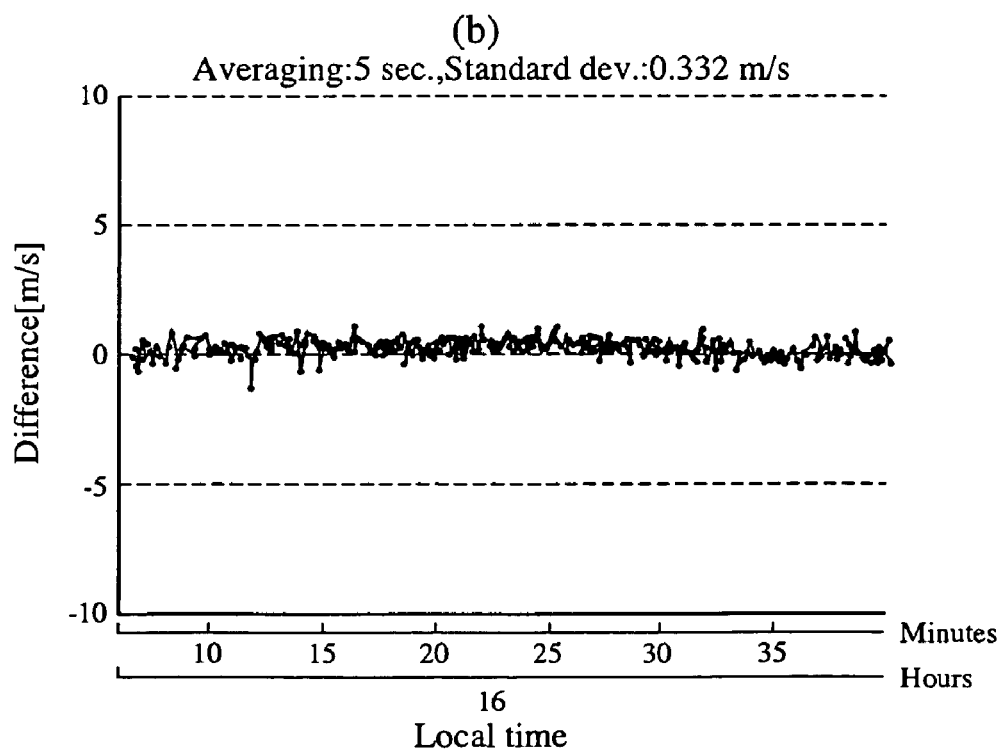

FIG. 4 shows the results of the experimental verification of the wind velocity offset correction.

FIG. 4(*a*) shows time series data 111 and 112 about the measured wind velocity (each has a series of 398 5-sec averaged points) obtained by the both measurement instruments, and it is clear from FIG. 4(*a*) that the trend in variations in the measured wind velocity data 111 substantially agrees with that in variations in the measured wind velocity data 112.

FIG. 4(*b*) shows the difference between the measurements obtained by the both measurement instruments, and it is clear from this figure that the average and standard deviation of the difference between the measurements obtained by the both measurement instruments are 0.035 m/s and 0.332 m/s, respectively, and 0.035 m/s of the average of the difference between the measurements is a digit smaller than the offset correction value of 0.77 m/s.

This shows that the velocity offset correction was carried out correctly.

When the cause of the occurrence of the above-mentioned velocity offset is the deviation in the transmission light frequency due to the self-phase modulation which will be explained in below-mentioned embodiment 3, the amount of offset correction is uniquely determined by the characteristics of the optical fibers through which the pulsed light is made to pass, and the shape and power of the pulsed light.

When carrying out a wind measurement under these conditions while fixedly setting specific transmission pulse conditions, the light wave radar apparatus can measure and store a deviation of the frequency of the pulsed light for each pulse emission condition for the pulsed light (e.g., a pulse shape and pulse power of the pulsed light) in a table in advance, as shown in FIG. 2, can read a frequency deviation corresponding to the pulsed light which is to be transmitted from the table, and can subtract an systematic error corresponding to the frequency deviation from the wind velocity.

In this case, the means (for example, the frequency deviation detecting unit 12 and weighted average processing unit 13) disposed on the transmission light path of the light wave radar, for estimating the frequency deviation of the pulsed light can be eliminated. Therefore, this variant offers an advantage of being able to reduce the loss of the transmission light path, and another advantage of being able to reduce the manufacturing cost because of the reduction in the component count, and to improve the ease of the fabrication of and the reliability of the light wave radar apparatus.

Embodiment 2

Figure 5:
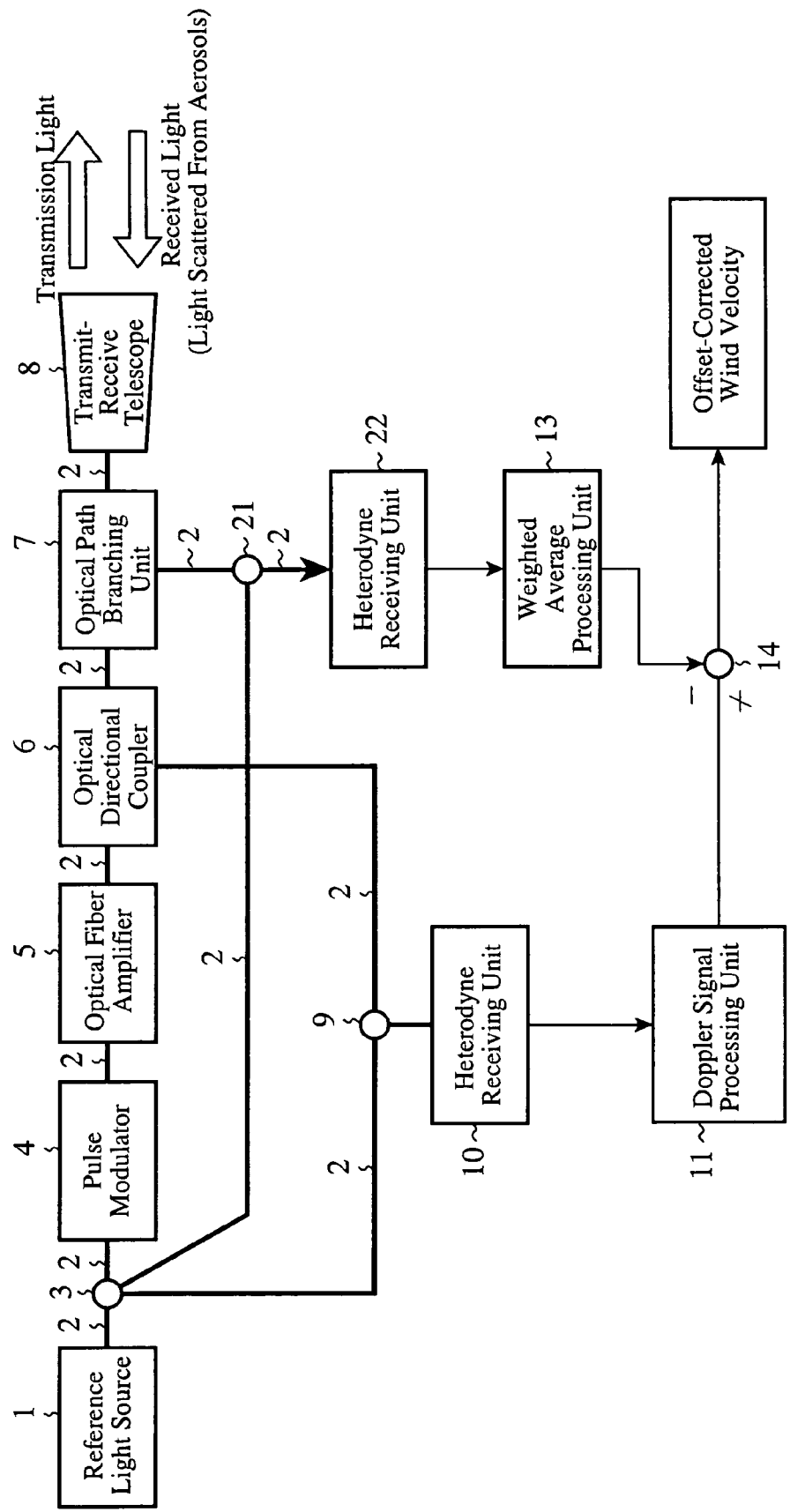
FIG. 5 is a block diagram showing a light wave radar apparatus in accordance with embodiment 2 of the present invention.

FIG. 5 is a block diagram showing a light wave radar apparatus in accordance with embodiment 2 of the present invention. In the figure, since the same reference numerals as shown in FIG. 1 denote the same components as those of embodiment 1 or like components, the explanation of the components will be omitted hereafter.

An optical path branching unit 21 combines local oscillation light of a frequency of ν outputted from an optical path branching unit 3, and pulsed light of a frequency of $(\nu+f_{chirp})$ outputted from an optical path branching unit 7 into combined light, and outputs the combined light to a heterodyne receiving unit 22.

The heterodyne receiving unit 22 detects an intensity alternating component of the combined light outputted from the optical path branching unit 21. Although both a sum frequency component of a frequency of $(2\nu+f_{chirp})$ equal to the sum of the frequency of the local oscillation light and that of the pulsed light and a difference frequency component of a frequency of $f_{chirp}$ equal to the difference between the frequency of the pulsed light and that of the local oscillation light are included in the intensity signal of the combined light, the heterodyne receiving unit 22 converts only the difference frequency component into an electric signal, and detects the frequency deviation $f_{chirp}$ from the electric signal.

A frequency deviation detecting means is provided with an optical path branching unit 7, the optical path branching unit 21, the heterodyne receiving unit 22, and a weighted average processing unit 13.

In accordance with above-mentioned embodiment 1, the frequency deviation detecting unit 12 detects the frequency deviation $f_{chirp}$ from a part of the pulsed light outputted from the optical path branching unit 7, as previously explained. In contrast, in accordance with this embodiment, the optical path branching unit 21 combines the local oscillation light outputted from the optical path branching unit 3, and the pulsed light outputted from the optical path branching unit 7 into combined light, and the heterodyne receiving unit 22 detects the frequency deviation $f_{chirp}$ from the combined light.

Hereafter, an explanation will be made as to an experimental example aimed at combining the local oscillation light and pulsed light into combined light so as to detect the frequency deviation $f_{chirp}$ of the pulsed light from the combined light.

Figure 6:
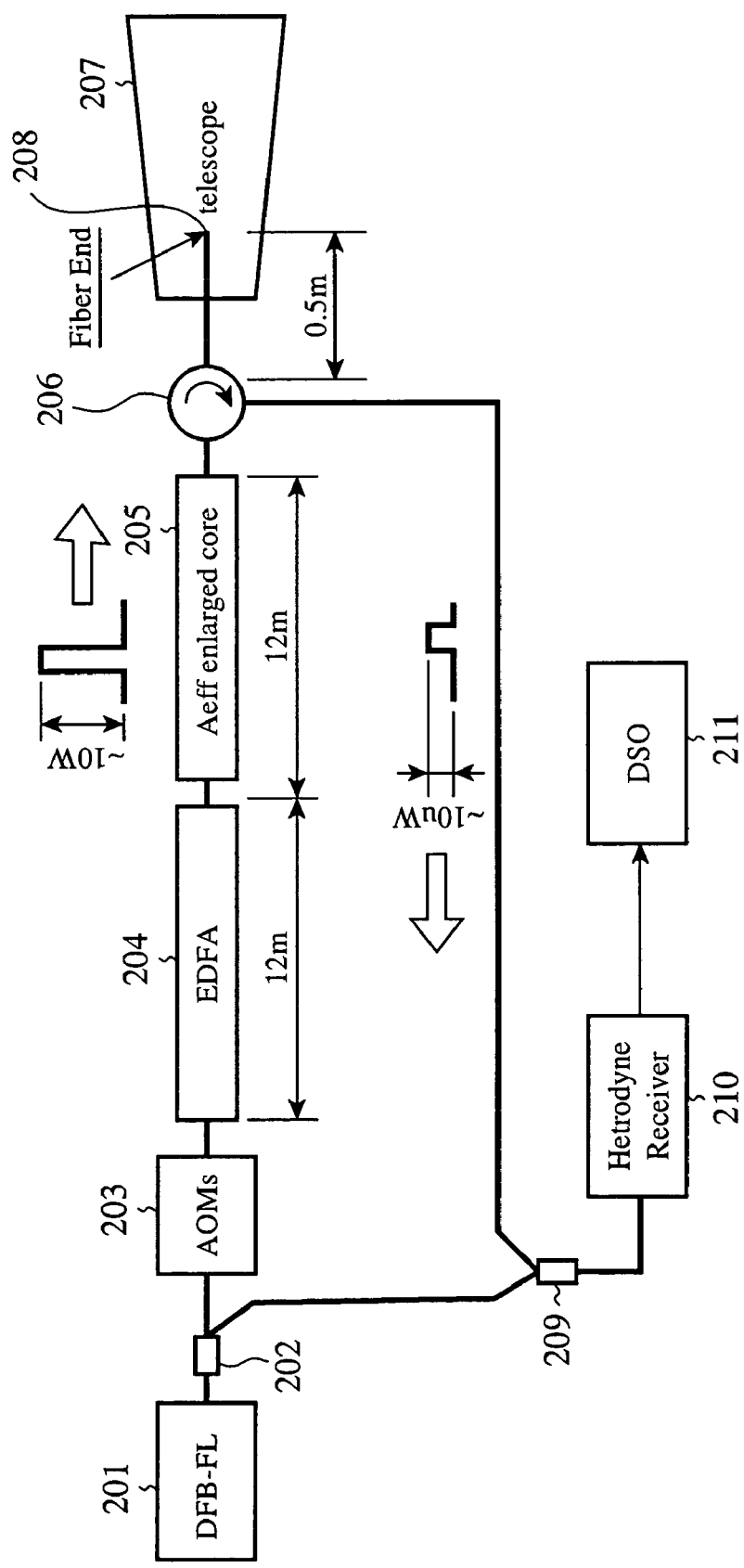
FIG. 6 is a block diagram showing a frequency deviation evaluation system for evaluating a frequency deviation of transmission light in the whole of the optical-fiber light wave radar apparatus.

FIG. 6 is a block diagram showing a frequency deviation evaluation system for evaluating the frequency deviation of the transmission light in the whole optical-fiber light wave radar apparatus.

An optical path branching unit 202 branches continuous-wave light having a spectral band width of 24.8 kHz outputted from a DFB (Distributed Feed Back)-fiber laser 201 which is a reference light source, and outputs a great part of the continuous-wave light to an AOMs (Acousto-Optic Modulator) 203 which is a pulse modulator.

When receiving the continuous-wave light having a spectral band width of 24.8 kHz, the AOMs 203 cuts out pulsed light having a pulse width of 1 μs and peak power of 1 mW from the continuous-wave light, and simultaneously provides a frequency shift of +100 MHz to the frequency of the pulsed light.

An EDFA (Erbium Doped Fiber Amplifier) 205 which is an optical fiber amplifier amplifies the pulsed light outputted from the AOMs 203 so that it has peak power of 14 W, and outputs the pulsed light to a transmit-receive telescope 207 via a circulator 206 of optical-fiber type which is a directional coupler.

In this experimental example, the frequency deviation of the pulsed light which is the transmission light is evaluated by heterodyne-detecting internally-reflected light reflected by an optical fiber end 208 located immediately before the transmit-receive telescope 207.

In other words, when receiving a part of the continuous-wave light outputted from the DFB-fiber laser 201 and the internally-reflected light reflected by the optical fiber end 208 via the optical path branching unit 209, the heterodyne receiving unit 210 heterodyne-detects the part of the continuous-wave light and internally-reflected light, and outputs a heterodyne-detected signal to a DSO 211 which is a digital storage oscilloscope.

When receiving the heterodyne-detected signal from the heterodyne receiving unit 210, the DSO 211 acquires time series data at 1280 points which are in the vicinity of an internally-reflected optical beat signal at a sampling rate of 1 GS/s.

Then, the DSO 211 carries out an off-line FFT process on the time series data in units of 256 points so as to extract spectra from the time series data.

The DSO 211 then determines the barycenter of each spectrum which is around the peak of each spectrum so as to calculate the center frequency for every FFT period.

Figure 7:
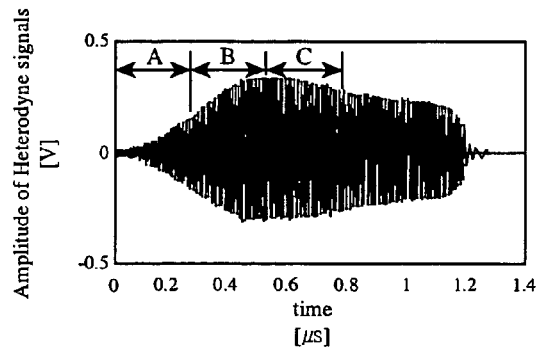
FIG. 7 is an explanatory diagram showing time series data (shown on a left-hand side) and a frequency-analysis result (shown on a right-hand side) obtained from a heterodyne-detected signal of internally-reflected light.
Figure 7:
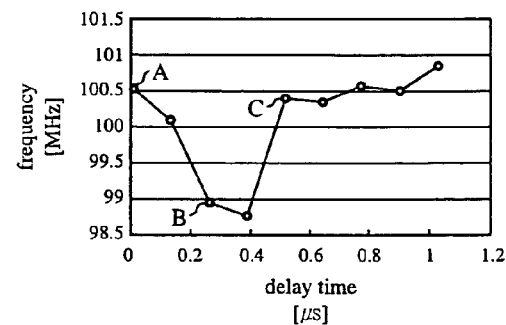
Figure 7:
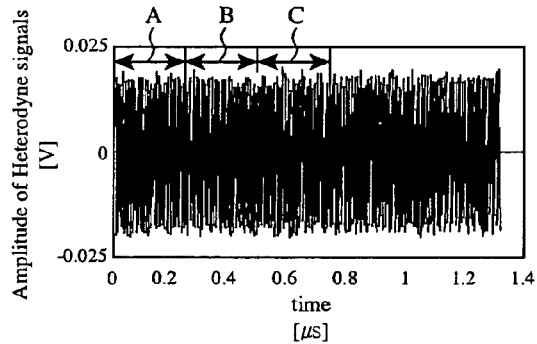
Figure 7:
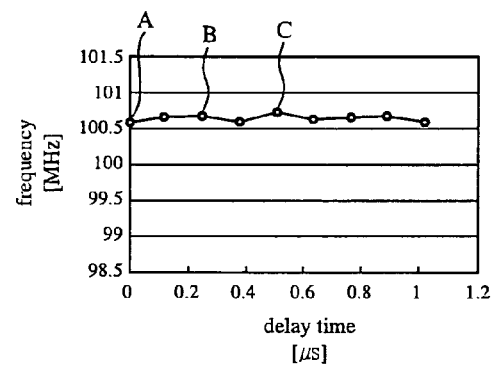
Figure 7:
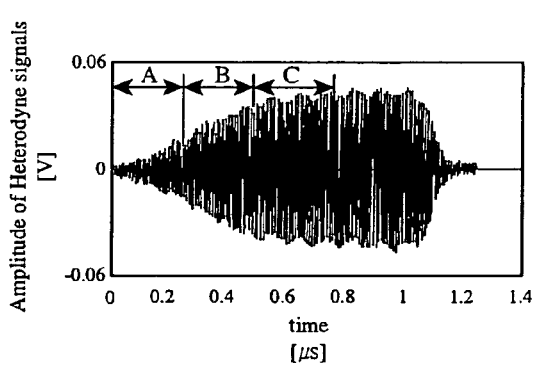
Figure 7:
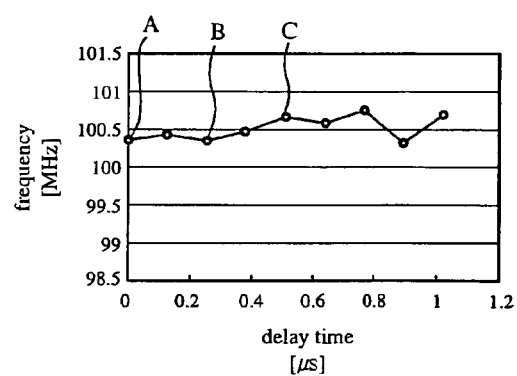

FIG. 7 is an explanatory diagram showing the time series data (shown on a left-hand side) and frequency-analysis result (shown on a right-hand side) obtained from the heterodyne-detected signal of the internally-reflected light.

Especially, FIG. 7(a) shows a result in the case where pulsed light is outputted as the transmission light using the EDFA, and it is clear from the center frequencies corresponding to the time-series periods A, B, and C of the figure that frequencies in the vicinity of the time series period B are lower than those of the time series periods A and C by about 1.5 MHz.

On the other hand, FIG. 7(b) shows a result in the case where CW (Continuous Wave) light is outputted as the transmission light, and it can be recognized from the figure that there is no significant frequency deviation within the periods which is a target for evaluation.

In order to check to see whether the cause of the frequency deviation shown in FIG. 7(a) occurs in or after the EDFA, the pulse light (having peak power of 1 mW) output from the AOMs is reduced properly, and is heterodyne-detected (see FIG. 7(c)).

As a result, it is clear that there is no significant frequency deviation in the time series period B in which a frequency deviation occurs in the case of FIG. 7(a).

As can be seen from the above description, it is possible to detect a frequency deviation which occurs systematically only from the pulsed light amplified by the EDFA.

In this evaluation experiment, although light reflected from the optical fiber end 208 is used as a method of extracting a part of the transmission light, instead of the optical path branching unit 7, the method is not limited to the use of the optical fiber end. As an alternative, light reflected from an internal reflection point between the optical guide means and the light transmit-receive means can be used.

For example, an internal reflection point of constant reflectivity which does not move with time, such as an internal reflection point of the circulator 206 or transmit-receive telescope 207, can be used.

In this case, since the optical path branching unit 7 can be eliminated, the loss of the transmission light path can be reduced, and the manufacturing cost can be reduced because of the reduction in the component count and the ease of the fabrication of and the reliability of the light wave radar apparatus can be improved.

In addition, since the light reflected from the internal reflection point and the scattered light resulting from a scattering by aerosols at a distance of Z[m] which are a target to be measured appear within the time series data of the heterodyne-detected signal at different times, it is possible to divide the time series period to be analyzed into a time period immediately after the pulse is outputted and a time period after a lapse of 2 Z/c seconds from the output of the pulse, and to analyze each signal with a time division technique, where c shows the velocity of light. In this case, the analysis of the frequencies of the internally-reflected light and scattered light scattered from aerosols can be carried out using an identical heterodyne receiving unit.

Therefore, since the heterodyne receiving units 10 and 22 can be unified, the manufacturing cost can be reduced because of the reduction in the component count and the ease of the fabrication of and the reliability of the light wave radar apparatus can be improved.

Embodiment 3

Figure 8:
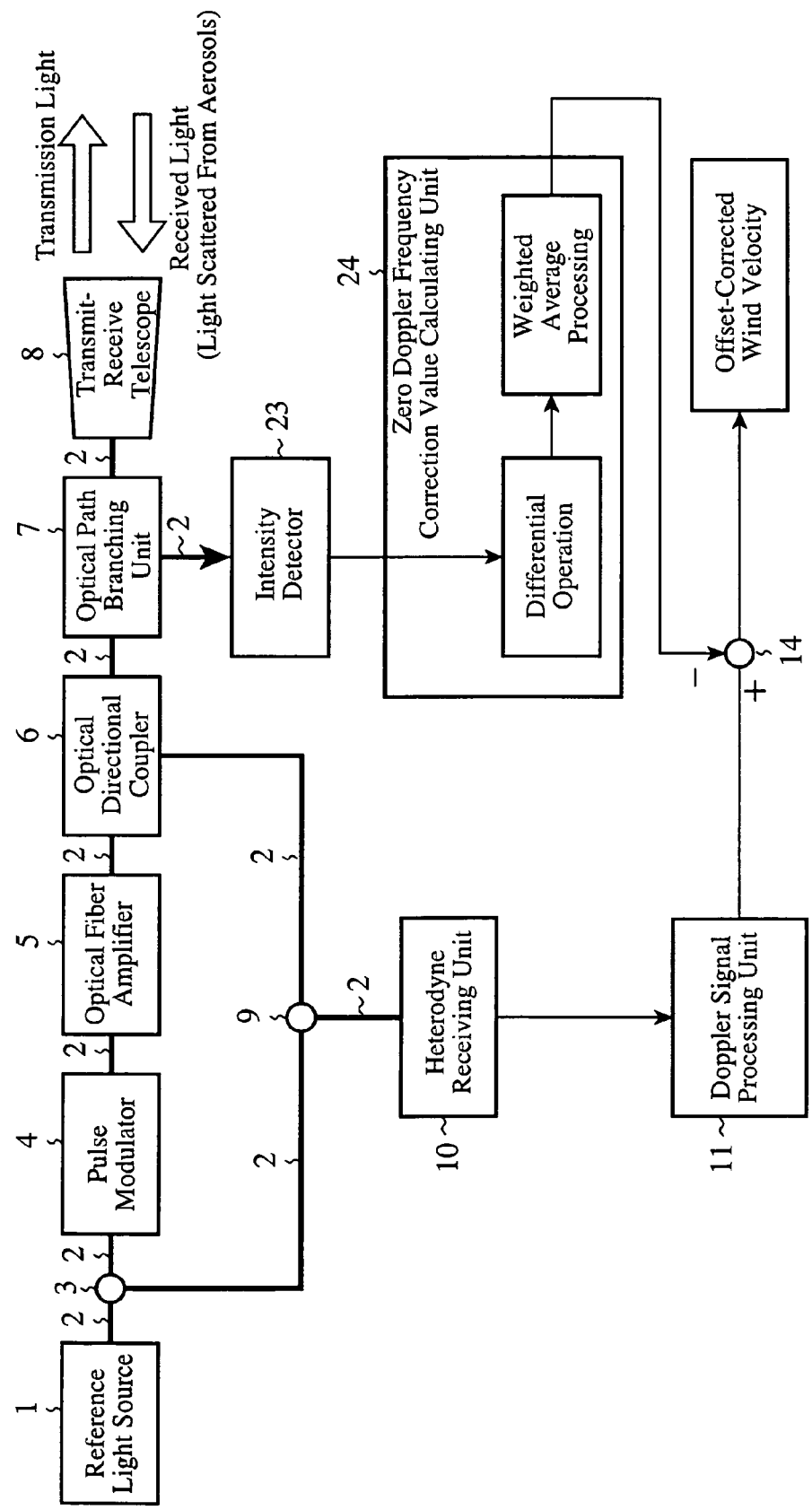
FIG. 8 is a block diagram showing a light wave radar apparatus in accordance with embodiment 3 of the present invention.

FIG. 8 is a block diagram showing a light wave radar apparatus in accordance with embodiment 3 of the present invention. In the figure, since the same reference numerals as shown in FIG. 1 denote the same components as those of embodiment 1 or like components, the explanation of the components will be omitted hereafter.

An intensity detecting unit 23 detects the intensity of a light signal outputted from an optical path branching unit 7.

A zero Doppler frequency correction value calculating unit 24 detects a frequency deviation $f_{chirp}$ of pulsed light from a temporal change in the intensity of the light signal detected by the intensity detecting unit 23, and determines a systematic error $\Delta V_{offset}$ from the frequency deviation $f_{chirp}$.

In accordance with above-mentioned embodiment, the optical path branching unit 21 combines the local oscillation light outputted from the optical path branching unit 3 and pulsed light outputted from the optical path branching unit 7 into combined light, and the heterodyne receiving unit 22 heterodyne-detects the combined light so as to detect the frequency deviation $f_{chirp}$ of the pulsed light, as previously explained. In contrast, the light wave radar apparatus in accordance with this embodiment can estimate the frequency deviation of the pulsed light from a temporal change in the intensity of the transmission light by using, as a priori information, the fact that the cause of the frequency deviation of the transmission pulsed light is a self-phase modulation which occurs in the transmission path.

Concretely, the light wave radar apparatus in accordance with this embodiment operates as follows.

When pulsed light is incident upon an optical medium, the refractive index of the optical medium varies with time according to the intensity of the pulsed light because of Kerr effect.

When the electric field A of light changes slowly along the direction in which the light propagates through the optical fiber (in the case of slowly varying approximation), a general formula of the self-phase modulation can be drawn from the following propagation equation:

$$i\frac{\partial A}{\partial z} = -\frac{i}{2}\alpha A + \frac{1}{2}\beta_2 \frac{\partial^2 A}{\partial T^2} - \frac{2\pi}{\lambda}\gamma|A|^2 A \qquad (3)$$

where $\alpha$ is an attenuation by the optical fiber, $\lambda$ is the wavelength of the light, and $\beta_2$ is a pulse width increase factor due to a refractive-index dispersion.

The third term of the right side of the equation (3) shows a nonlinear optical effect including a nonlinear optical coefficient $\gamma$ expressed by the following equation (4):

$$\gamma = \frac{n_2 \omega_0}{c A_{eff}} = \frac{2\pi}{\lambda}\frac{n_2}{A_{eff}} \qquad (4)$$

where c is the velocity of light, $A_{eff}$ is an optical-fiber effective core area, $P_0$ is the peak power of the pulsed light, $\omega_0$ is the frequency of the light, and $n_2$ is a nonlinear refractive index associated with the third nonlinear polarization.

Assuming that $\beta_2=0$ (zero dispersion) in order to take the self-phase modulation into consideration, and representing the electric field A of light with a normalized amplitude U given by the following equation (5), the solution of the normalized amplitude U is expressed by the following equation (6):

$$A(z,T)=\sqrt{P_0}\exp[-\alpha z/2]U(z,T) \qquad (5)$$

$$U(z,T)=U(0,T)\exp[i\phi_{NL}(z,T)] \qquad (6)$$

where U(0, T) shows the normalized amplitude which is defined at a propagation distance z=0, and $\phi_{NL}$ shows a nonlinear phase deviation expressed by the following equation (7):

$$\varphi_{NL}(z, T) = |U(0, T)|^2 \frac{L_{eff}}{L_{NL}} \qquad (7)$$

$L_{eff}$ shows an effective propagation distance and $L_{NL}$ shows a nonlinear length, and they are expressed by the following equations (8) and (9), respectively.

$$L_{eff} = \frac{1 - \exp[-\alpha L]}{\alpha} \qquad (8)$$

$$L_{NL} = \frac{1}{\gamma P_0} \qquad (9)$$

On the other hand, a temporal change in the nonlinear phase deviation $\phi_{NL}$ appears as the frequency deviation (chirp) of the light.

$$f_{chirp} = -\frac{1}{2\pi}\frac{\partial \phi_{NL}(z, T)}{\partial T} = -\frac{1}{2\pi}\left(\frac{L_{eff}}{L_{NL}}\right)\frac{\partial}{\partial T}|U(0, T)|^2 \qquad (10)$$

As a result, the transmission pulsed light has a frequency which decreases in a rising portion thereof (i.e., within a time period during which the differential coefficient of $|U(0, T)|^2$ with respect to time is positive), whereas the transmission pulsed light has a frequency which increases in a falling portion thereof.

Assuming that the wavelength is 1.5 μm, the loss α of a typical single mode optical fiber is of order of about −0.2 dB/km, and therefore it can be ignored for about several tens of m of fiber length and $L_{eff}$ can be approximated to the length L of the optical fiber.

For this reason, it is clear that the frequency deviation has a property of being proportional to the peak power $P_0$ of the pulsed light, fiber length L, and rate $d|U|^2/dt$ of temporal change in the pulsed light of a nonlinear refractive index of $n_2$, and being inversely proportional to the effective core area $A_{eff}$ of the optical fiber.

Figure 9:
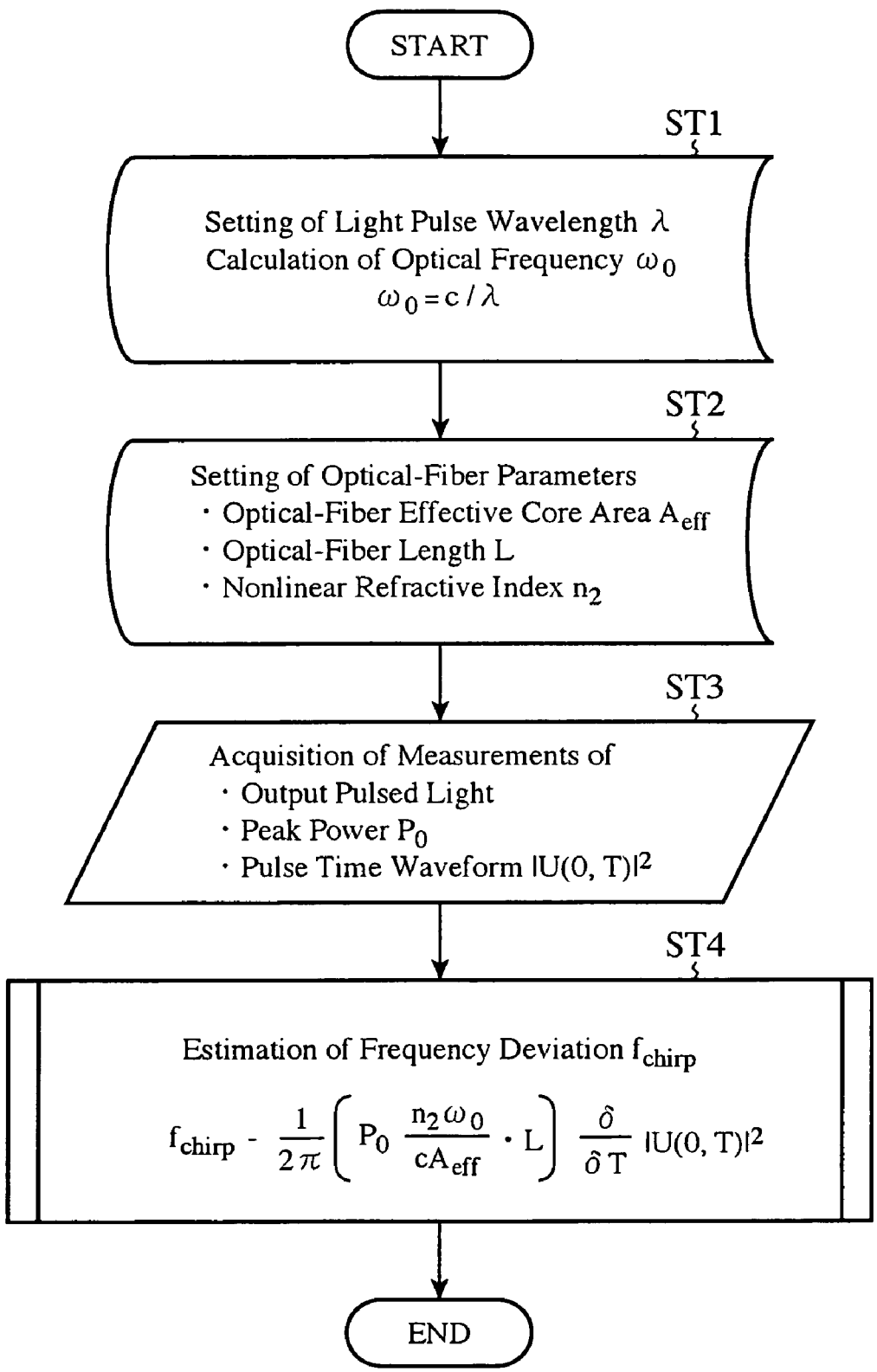
FIG. 9 is a flow chart showing a procedure for estimating a frequency deviation $f_{chirp}$.

By using the above-mentioned property as a priori information, the frequency deviation of the transmission light can be estimated. FIG. 9 is a flow chart showing a procedure for estimating the frequency deviation $f_{chirp}$.

First, the zero Doppler frequency correction value calculating unit 24 sets the wavelength λ of the target light so as to calculate the optical frequency $\omega_0$ (in step ST1).

$$\omega_0 = c/\lambda \tag{11}$$

The zero Doppler frequency correction value calculating unit 24 also sets the effective core area $A_{eff}$, fiber length L, and nonlinear refractive index $n_2$ which are parameters of the optical fiber 2 to be used (in step ST2).

The zero Doppler frequency correction value calculating unit 24 acquires the intensity of the light pulse detected by the intensity detecting unit 23, i.e., the peak power $P_0$ and normalized intensity time waveform $|U(0, T)|^2$ of the transmission pulsed light (in step ST3).

The zero Doppler frequency correction value calculating unit 24 then substitutes the optical frequency $\omega_0$ calculated in step ST1, parameters set in step ST2, and peak power $P_0$ and normalized intensity time waveform $|U(0, T)|^2$ which are acquired in step ST3 into the equations (4) and (8) to (10), so as to calculate the frequency deviation $f_{chirp}$ (in step ST4).

After calculating the frequency deviation $f_{chirp}$, the zero Doppler frequency correction value calculating unit 24 acquires a weighted average of the frequency deviation $f_{chirp}$, and also acquires a systematic error $\Delta V_{offset}$ from the weighted-averaged frequency deviation $f_{chirp}$, like the weighted average processing unit 13 shown in FIG. 1.

The validity of the above-mentioned relational expressions was verified by experiment. The wavelength of the light used for the experiment was λ=1540 nm, and an Er-doped optical fiber ($A_{eff}$=65 μm² and L=12 m) and a core enlarged optical fiber for transmission ($A_{eff}$=130 μm² and L=12 m) were connected to each other as fiber parameters for transmission. It was assumed that the nonlinear refractive index was the one ($n_2$=2.6×10⁻²⁰ m²/W) of a standard single mode optical fiber.

Figure 10:
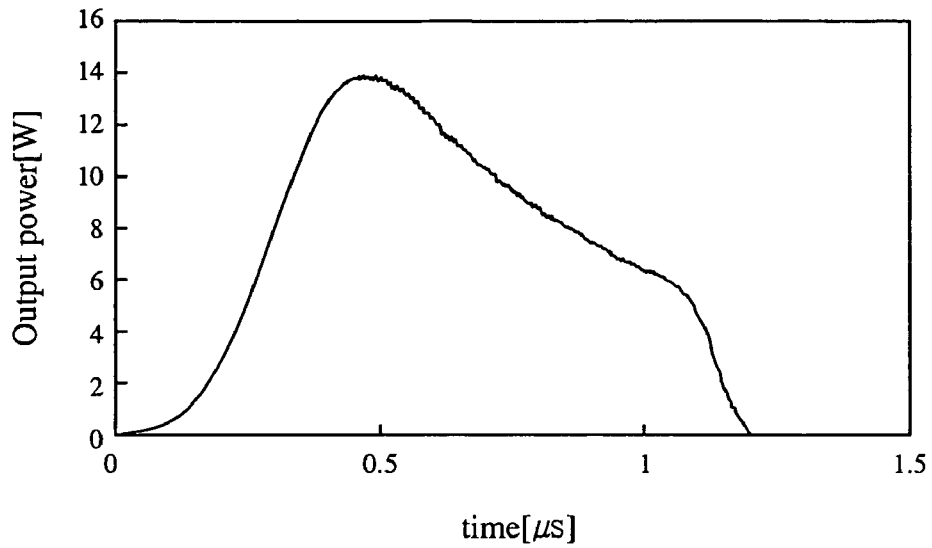
FIG. 10 is an explanatory diagram showing the output pulse intensity waveform of transmission light.

FIG. 10 shows the output pulse intensity waveform of the transmission light.

Figure 11:
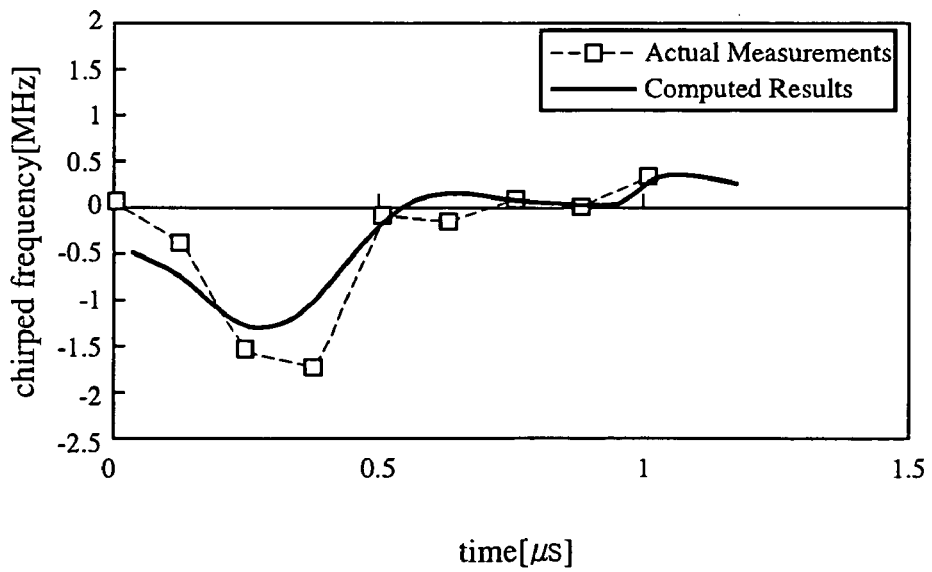
FIG. 11 is an explanatory diagram showing a computed result of the frequency deviation of the transmission light, which is based on self-phase modulation.

As shown in this figure, the peak power $P_0$ was 14 W. $|U(0, T)|^2$ was calculated by numerically differentiating the intensity of the transmission light with respect to time. The solid line of FIG. 11 shows the result which is calculated by substituting the above-mentioned parameters $P_0$, $A_{eff}$, L, and $n_2$ into the equations (4) and (8) to (10). It is clear that the solid line is considerably in agreement with the actual measurement of the frequency deviation obtained with the optical heterodyne detection, which is shown by a dotted line of FIG. 11 (i.e., the measured result which is explained with reference to the right-hand side of FIG. 7(a) in embodiment 2).

The above-mentioned evaluation result shows that the frequency deviation of the transmission light can be estimated correctly in accordance with this embodiment 3.

The method of estimating the frequency deviation of the transmission light in accordance with this embodiment 3 offers an advantage of being able to simplify the apparatus since the heterodyne receiving unit 22 can be eliminated and only the setting of the initial parameters and measurement of the time waveform of the light intensity are needed to estimate the frequency deviation of the transmission light.

In addition, in accordance with this embodiment 3, the optical path branching unit 7 is used as a transmission path used for detecting the intensity of the transmission light. As an alternative, reflected light reflected from an optical component located in the vicinity of the light emitting end of an optical fiber for transmission, e.g., internally-reflected light reflected from a position having constant reflectivity, such as internally-reflected light reflected from a light emitting fiber end or the optical directional coupler 6, can be used to detect the intensity of the transmission light. By calibrating the level of this internally-reflected light in advance, the intensity of the transmission light can be monitored.

Therefore, this variant offers an advantage of being able not only to eliminate the optical path branching unit 7 disposed in the transmission path to simplify the structure of the apparatus because of the use of the internally-reflected light, but also to reduce the loss caused by the insertion of the optical path branching unit 7 into the transmission path.

Embodiment 4

The light wave radar apparatus in accordance with above-mentioned embodiment 3 estimates the frequency deviation of the transmission pulsed light by using, as a priori information, the fact that the cause of the frequency deviation of the transmission pulsed light is the self-phase modulation which occurs in the transmission path. In this embodiment, a method of reducing the frequency deviation of the transmission light which is caused by the self-phase modulation will be explained.

In other words, as can be seen from the equations (4) and (8) to (10), the frequency deviation $f_{chirp}$ of the transmission light which is caused by the self-phase modulation explained in above-mentioned embodiment 3 has a property of being proportional to the peak power $P_0$ of the pulsed light, fiber length L, and rate $d|U|^2/dt$ of temporal change in the pulsed light, and being inversely proportional to the effective core area $A_{eff}$ of the optical fiber.

Therefore, in accordance with this embodiment 4, the frequency deviation of the transmission light is reduced by shortening the optical fiber length L.

The optical fiber length L which limits the largest frequency deviation of the transmission light to $|\Delta f_c|$ falls within a range given by the following equation (12). In other words, the optical fiber length L is made to be smaller than a reference value given by the right-hand side of the equation (12).

$$L \leq |\Delta f_c| \cdot 2\pi \frac{cA_{eff}}{n_2 \omega_0 P_0} \cdot \frac{1}{\left|\frac{\partial}{\partial T}|U(0, T)|^2\right|} \tag{12}$$

This embodiment 4 therefore offers an advantage of being able to estimate the longest optical fiber length according to the desired frequency deviation range from the time characteristics of the light pulse to be used and the parameters of the material of which the optical fiber to be used is made, and being able to provide an indicator effective for examination of the placement of the components according to the optical fiber length.

Embodiment 5

The light wave radar apparatus in accordance with above-mentioned embodiment 4 reduces the frequency deviation of the transmission pulsed light by shortening the length of the optical fiber through which the transmission light passes by using, as a priori information, the fact that the cause of the frequency deviation of the transmission pulsed light is the self-phase modulation which occurs in the transmission path. As an alternative, the light wave radar apparatus can reduce the frequency deviation of the transmission pulsed light by increasing the effective core area of the optical fiber.

In other words, as can be seen from the equations (4) and (8) to (10), the frequency deviation $f_{chirp}$ of the transmission light which is caused by the self-phase modulation explained in above-mentioned embodiment 3 has a property of being proportional to the peak power $P_0$ of the pulsed light, fiber length L, and rate $d|U|^2/dt$ of temporal change in the pulsed light, and being inversely proportional to the effective core area $A_{eff}$ of the optical fiber.

Therefore, in accordance with this embodiment 5, the frequency deviation of the transmission light is reduced by enlarging the effective core area $A_{eff}$ of the optical fiber.

The effective core area $A_{eff}$ of the optical fiber which limits the largest frequency deviation of the transmission light to $|\Delta f_c|$ falls within a range given by the following equation (13). In other words, the effective core area $A_{eff}$ of the optical fiber is made to be larger than a reference value given by the right-hand side of the equation (13).

$$A_{eff} \geq \frac{1}{|\Delta f_c|} \cdot \frac{n_2 \omega_0 P_0}{2\pi c} \cdot \left| \frac{\partial}{\partial T} |U(0, T)|^2 \right| \quad (13)$$

As an alternative, the equation (13) is transformed into the following equation (14), and the characteristics of the optical fiber are selected or designed so that a nonlinear constant $n_2/A_{eff}$ of the optical fiber falls within a range given by the following equation (14):

$$\frac{n_2}{A_{eff}} \leq |\Delta f_c| \cdot 2\pi \frac{c}{L\omega_0 P_0} \cdot \frac{1}{\left| \frac{\partial}{\partial T} |U(0, T)|^2 \right|} \quad (14)$$

This embodiment 5 therefore offers an advantage of being able to estimate the smallest effective core area $A_{eff}$ or nonlinear constant $n_2/A_{eff}$ of the optical-fiber according to the desired frequency deviation range from the time characteristics of the light pulse to be used and the parameters of the material of which the optical fiber to be used is made, and being able to provide an indicator effective for selection or design examination of the optical fiber used as the transmission optical path.

INDUSTRIAL APPLICABILITY

As mentioned above, the light wave radar apparatus in accordance with the present invention is suitable for needing to measure a wind velocity with a high degree of precision when emitting pulsed light toward a space, and measuring the wind velocity according to a Doppler shift of scattered light resulting from a scattering of the pulsed light by movements of aerosols in the space.

The invention claimed is:

1. A light wave radar apparatus comprising:
   a light emitting means for emitting a light signal;
   an optical guide means for propagating the light signal emitted out of said light emitting means;
   a light transmit-receive means for emitting the light signal propagated by said optical guide means toward a space, and for collecting scattered light resulting from a scattering of the light signal by the space;
   a wind velocity calculating means for combining a part of the light signal emitted out of said light emitting means and the scattered light collected by said light transmit-receive means to generate combined light, and for calculating a wind velocity in a sight line direction from the combined light; and
   a frequency deviation detecting means for detecting a frequency deviation of the light signal due to propagation by said optical guide means.

2. The light wave radar apparatus according to claim 1, characterized in comprising a wind velocity correcting means for correcting the wind velocity calculated by the wind velocity calculating means according to the frequency deviation detected by the frequency deviation detecting means.

3. The light wave radar apparatus according to claim 1, characterized in that the frequency deviation detecting means detects the frequency deviation from the light signal propagated by the optical guide means.

4. The light wave radar apparatus according to claim 1, characterized in that the frequency deviation detecting means combines a part of the light signal emitted out of the light emitting means and a part of the light signal propagated by the optical guide means to generate combined light, and detects the frequency deviation of the light signal from the combined light.

5. The light wave radar apparatus according to claim 1, characterized in that the frequency deviation detecting means combines a part of the light signal emitted out of the light emitting means, and a light signal reflected by an internal reflection point between the optical guide means and the light transmit-receive means to generate combined light, and detects the frequency deviation of the light signal from the combined light.

6. The light wave radar apparatus according to claim 1, characterized in that the frequency deviation detecting means detects an intensity of the light signal propagated by the optical guide means, and detects the frequency deviation of the light signal from a temporal change in the intensity of the light signal.

7. The light wave radar apparatus according to claim 1, characterized in that the frequency deviation detecting means has a table for storing frequency deviations corresponding to a plurality of light signals having different pulse shapes, and reads a frequency deviation corresponding to the light signal propagated by the optical guide means from the table.

8. The light wave radar apparatus according to claim 1, characterized in that a transmission path of the optical guide means has a propagation length which is smaller than a reference value which is determined by an allowable error of the frequency deviation of the light signal, an effective core area and a nonlinear refractive index of said transmission path, and an oscillation frequency and an intensity of the light signal.

9. The light wave radar apparatus according to claim 1, characterized in that a transmission path of the optical guide means has an effective core area which is larger than a reference value which is determined by a nonlinear refractive index of the transmission path, an oscillation frequency and an intensity of the light signal, and an allowable error of the frequency deviation of the light signal.

* * * * *